US009539985B2

(12) United States Patent
Mouth

(10) Patent No.: US 9,539,985 B2
(45) Date of Patent: Jan. 10, 2017

(54) WINDSCREEN WIPER ARM

(75) Inventor: Davy Mouth, Aubange (BE)

(73) Assignee: Federal-Mogul S.A., Aubange (BE)

( * ) Notice: Subject to any disclaimer, the term of this patent is extended or adjusted under 35 U.S.C. 154(b) by 145 days.

(21) Appl. No.: 14/365,730

(22) PCT Filed: Dec. 16, 2011

(86) PCT No.: PCT/EP2011/073063
§ 371 (c)(1),
(2), (4) Date: Jun. 16, 2014

(87) PCT Pub. No.: WO2013/087121
PCT Pub. Date: Jun. 20, 2013

(65) Prior Publication Data
US 2014/0345077 A1 Nov. 27, 2014

(51) Int. Cl.
*B60S 1/34* (2006.01)
(52) U.S. Cl.
CPC .............. *B60S 1/3456* (2013.01); *B60S 1/345* (2013.01); *B60S 1/3436* (2013.01); *B60S 1/3452* (2013.01); *Y10T 29/49959* (2015.01)
(58) Field of Classification Search
CPC ....... B60S 1/345; B60S 1/3456; B60S 1/3436; B60S 1/3431; B60S 1/3452
USPC ..................... 15/250.351, 250.352
See application file for complete search history.

(56) References Cited

U.S. PATENT DOCUMENTS 7,996,952 B2 * 8/2011 Horstman ............. B60S 1/3431
15/250.351

FOREIGN PATENT DOCUMENTS

| DE | 102001031322 A1 | 2/2006 |
|---|---|---|
| DE | 102010001183 A1 | 7/2011 |
| JP | S5228826 U | 2/1977 |
| JP | 2001001868 A | 1/2001 |
| JP | 2003335223 A | 11/2003 |
| JP | 2005075050 A | 3/2005 |
| WO | WO2008/029988 A1 | 3/2008 |

* cited by examiner

*Primary Examiner* — Gary Graham
(74) *Attorney, Agent, or Firm* — Robert L. Stearns; Dickinson Wright, PLLC

(57) ABSTRACT

A windscreen wiper arm, particularly for automobiles, includes comprising a mounting head mountable on a drive shaft and an arm member pivotally connected to the mounting head by means of a pivot pin, and wherein the arm member can be pivoted between a wiping position, wherein the arm member extends parallel to a windscreen to be wiped, and an elevated position, wherein the arm member and/or a windscreen wiper blade to be attached thereto can be repaired or replaced, characterized in that the windscreen wiper arm is provided with locking means arranged to lock the arm member onto the pivot pin in order to prevent the arm member from disengaging from the pivot pin in the elevated position of the arm member.

8 Claims, 8 Drawing Sheets

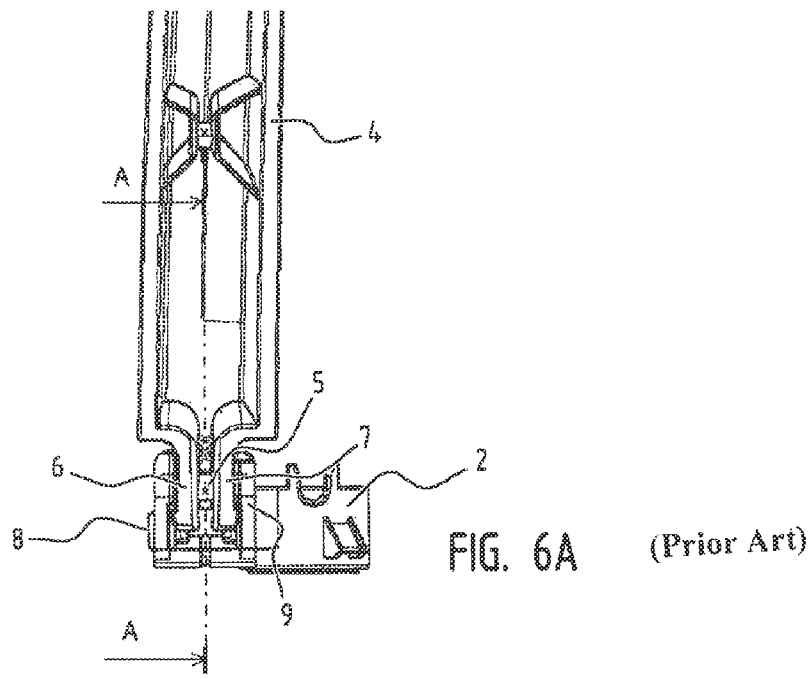
FIG. 6A (Prior Art)
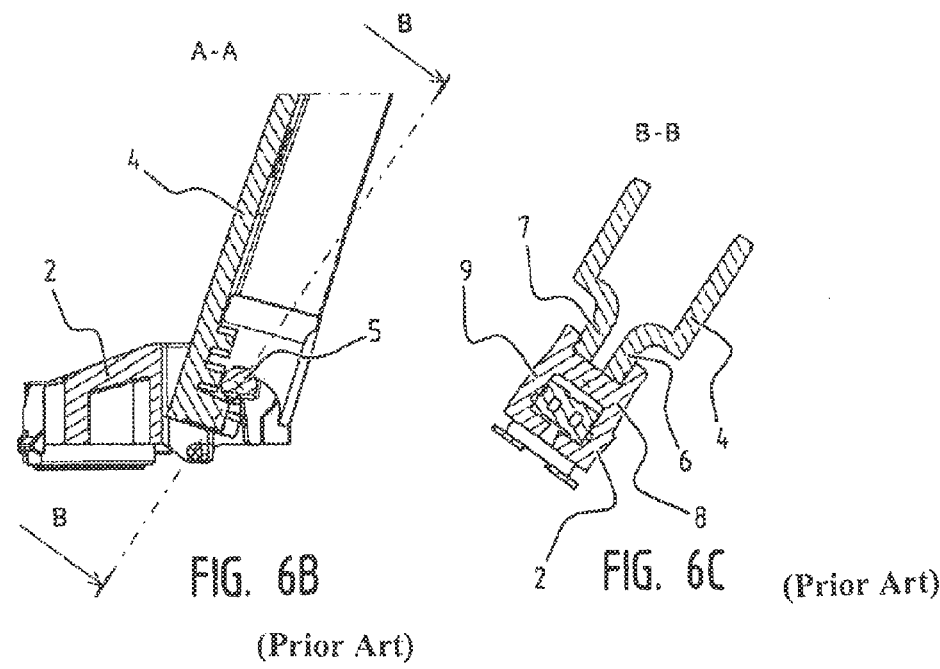
FIG. 6B (Prior Art)
FIG. 6C (Prior Art)

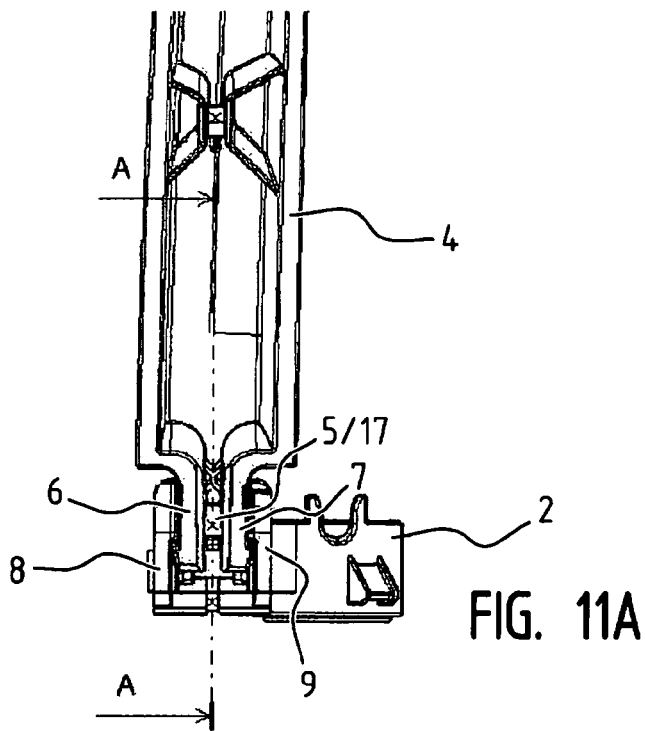
FIG. 11A
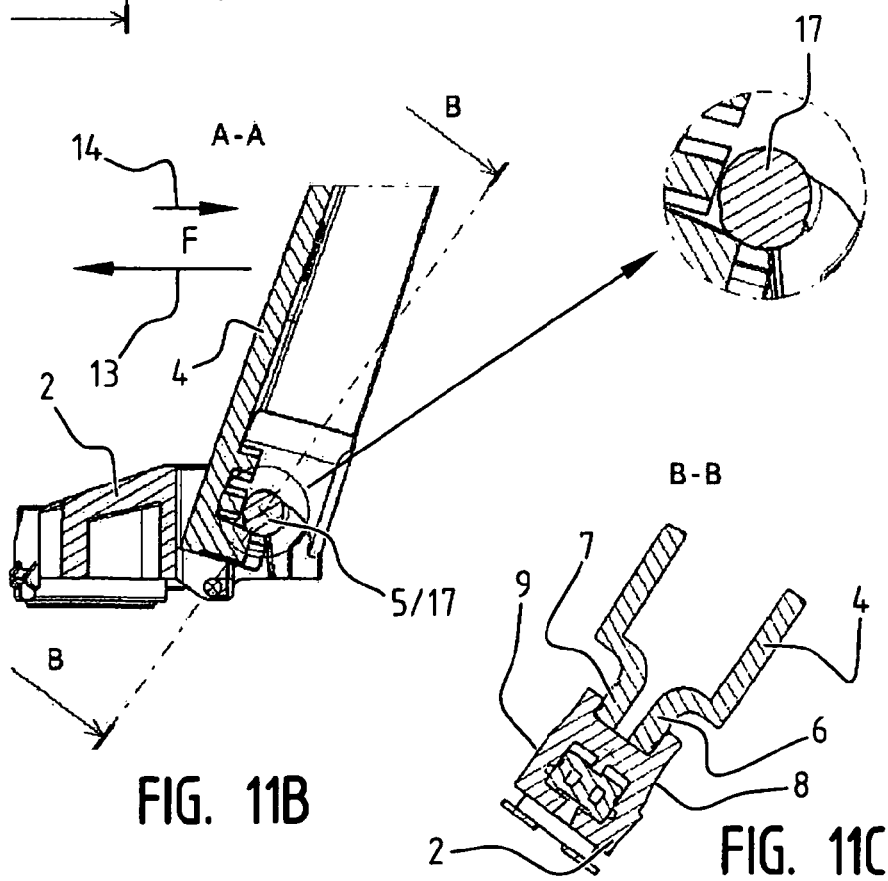
FIG. 11B
FIG. 11C

WINDSCREEN WIPER ARM

BACKGROUND OF THE INVENTION

1. Technical Field

The present invention relates to a windscreen wiper arm, particularly for automobiles, comprising a mounting head mountable on a drive shaft and an arm member pivotally connected to the mounting head by means of a pivot pin, and wherein the arm member can be pivoted between a wiping position, wherein the arm member extends parallel to a windscreen to be wiped, and an elevated position (i.e. service position), wherein the arm member and/or a windscreen wiper blade to be attached thereto can be repaired or replaced.

2. Related Art

Such a windscreen wiper arm is generally known.

A disadvantage of the known windscreen wiper arm is that a pivot movement of the arm member thereof relative to the mounting head thereof in a direction away from a windscreen to be wiped, is allowed beyond a certain maximum pivot angle. This may lead in the arm member getting loose from the mounting head, with all negative consequences involved.

SUMMARY OF THE INVENTION

It is an object of the invention to obviate this disadvantage, in the sense that at minimum costs—without using complex machinery and additional tools—windscreen wiper arms are proposed, wherein the mounting head and the arm member are interconnected in a reliable and secure manner.

It is noted that the present invention is not restricted to cars, but also refers to rail coaches and other (fast) vehicles.

Thereto, according to the invention a windshield wiper arm mentioned in the preamble is characterized in that the windscreen wiper arm is provided with locking means arranged to lock the arm member onto the pivot pin in order to prevent the arm member from disengaging from the pivot pin in the elevated position of the arm member.

In a preferred embodiment of a windscreen wiper arm in accordance with the invention the arm member has a substantially U-shaped cross-section near the pivot pin, wherein sidewalls of the U-shaped cross-section are each provided with a recess accommodating the pivot pin, wherein the locking means are arranged to lock the pivot pin into the recesses in order to prevent the pivot pin from disengaging from the recesses in the elevated position of the arm member.

In another preferred embodiment of a windscreen wiper arm according to the invention the locking means are formed onto the recesses.

In a preferred embodiment of a windscreen wiper arm in accordance with the invention the locking means are formed onto the pivot pin. Particularly, the pivot pin forms an integral part of the mounting head bridging two opposite surfaces of the mounting head at the location of the connection to the arm member.

In another preferred embodiment of a windscreen wiper arm according to the invention the locking means are formed by at least one protrusion on the pivot pin, wherein, in the wiping position of the arm member, the protrusion extends downwardly from the pivot pin towards the windscreen to be wiped in order to lock the pivot pin into the recesses in order to prevent the pivot pin from disengaging from the recesses in the elevated position of the arm member. Particularly, in the elevated position of the arm member, the protrusion abuts against an end wall of the U-shaped cross-section of the arm member.

In another preferred embodiment of a windscreen wiper arm in accordance with the invention the arm member is made of metal.

In another preferred embodiment of a windscreen wiper arm according to the invention the arm member is preferably made of a plastic material.

The present invention also refers to a mounting head and/or an arm member as defined in a windscreen wiper arm in accordance with the invention.

Further, the present invention also relates to a windscreen wiper device of the "flat blade" type connected to a windscreen wiper arm according to the invention. Preferably, the windscreen wiper device comprises an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, which windscreen wiper device comprises a connecting device for the windscreen wiper arm according to the invention.

Finally, the present invention is directed to a method for manufacturing a windscreen wiper arm, particularly for automobiles, comprising a mounting head mountable on a drive shaft and an arm member pivotally connected to the mounting head by means of a pivot pin, and wherein the arm member can be pivoted between a wiping position, wherein the arm member extends parallel to a windscreen to be wiped, and an elevated position, wherein the arm member and/or a windscreen wiper blade to be attached thereto can be repaired or replaced, characterized in that the windscreen wiper arm is provided with locking means arranged to lock the arm member onto the pivot pin in order to prevent the arm member from disengaging from the pivot pin in the elevated position thereof.

THE DRAWINGS

The invention will now be explained in more detail with reference to figures illustrated in a drawing, wherein:

FIG. 4 is a cross-sectional view of a position during assembly according to the prior art (FIG. 4a) of an arm member and the mounting head of FIG. 3, as used in a windscreen wiper arm of the type of FIG. 1, whereas FIG. 4b is a cross-sectional view along the line G-G in FIG. 4a;

FIG. 5 is a cross-sectional view of a so-called working position according to the prior art (FIG. 5a) of the arm member and the mounting head of FIG. 4, as used in a windscreen wiper arm of the type of FIG. 1, whereas FIGS. 5b, 5c and 5d are a cross-sectional view along the line C-C, D-D and E-E, respectively, in FIG. 5a;

FIG. 6 is a front view of the service position according to the prior art (FIG. 6a) of the arm member and the mounting head of FIGS. 4 and 5, as used in a windscreen wiper arm of the type of FIG. 1, whereas FIGS. 6b and 6c are a cross-sectional view along the line A-A in FIG. 6a and the line B-B in FIG. 6b, respectively;

Figure 1:
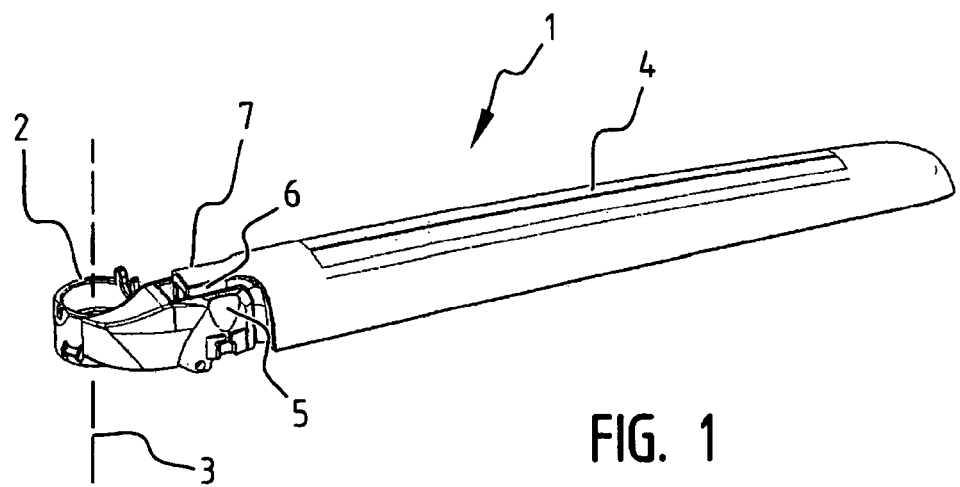
FIG. 1 is a perspective, schematic view of a preferred embodiment of a windscreen wiper arm according to the invention (without a windscreen wiper blade)
Figure 3:
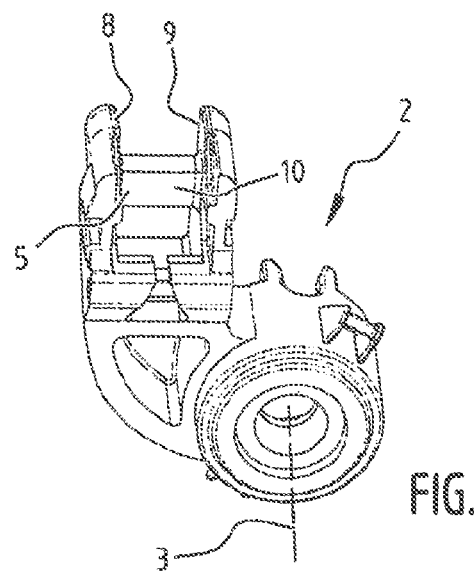
FIG. 3 is a perspective, schematic view of a mounting head according to the prior art.
Figure 4A:
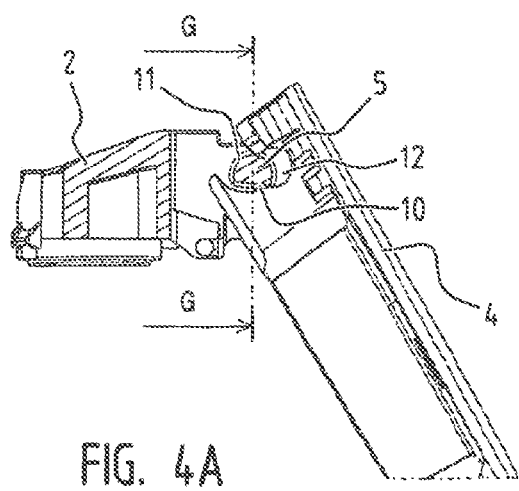
Figure 4B:
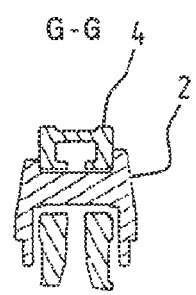
Figure 5A:
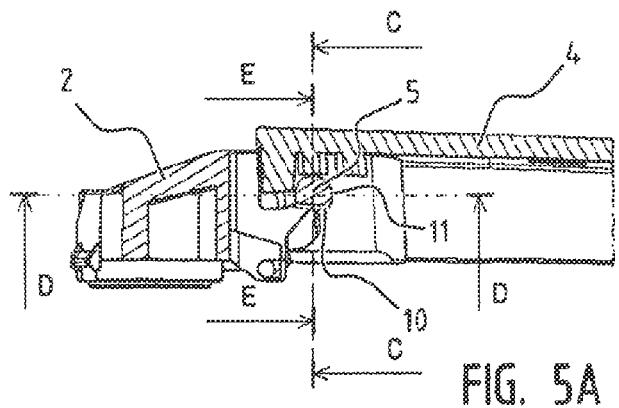
Figure 5B:
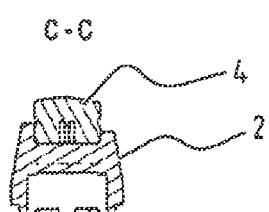
Figure 5C:
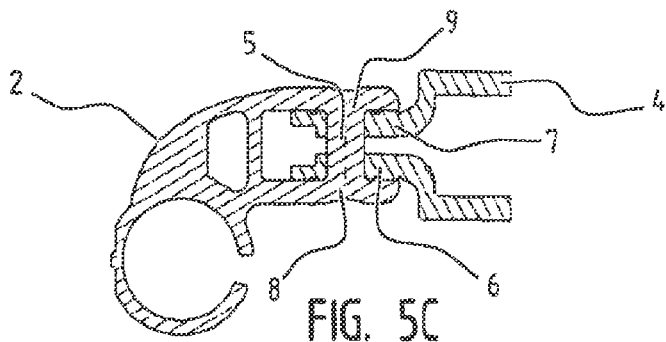
Figure 5D:
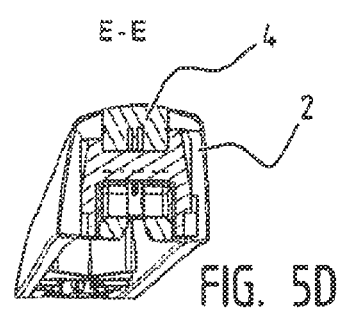
Figure 7:
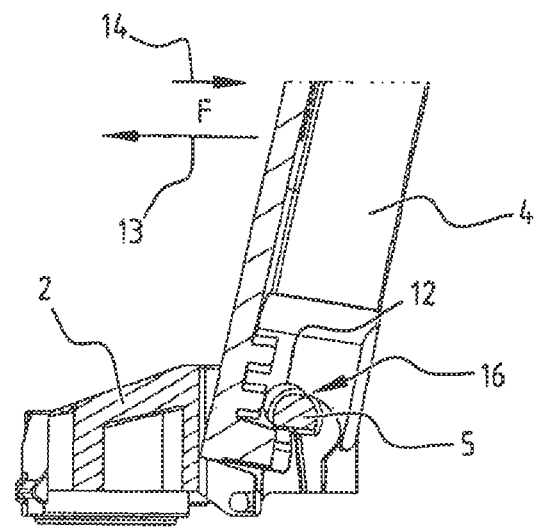
Figure 8:
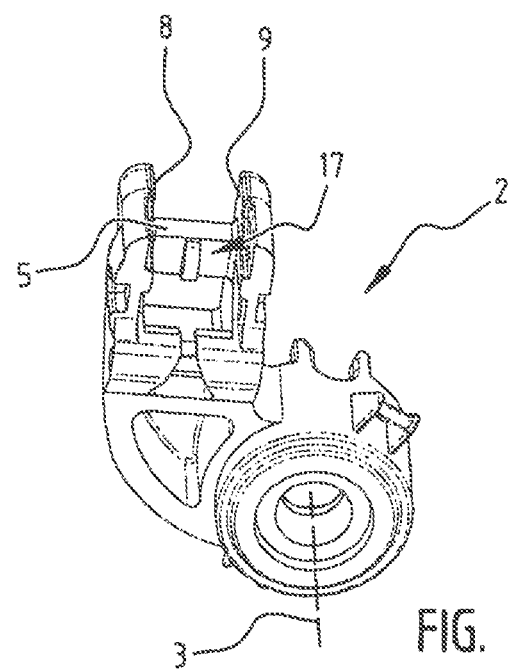

FIG. 7 is a cross-sectional view of the service position according to the prior art of the arm member and the mounting head of FIGS. 4, 5 and 6, as used in a windscreen wiper arm of the type of FIG. 1, showing a disengagement of the arm member; and FIGS. 8 through 11 correspond to FIGS. 3 through 6, but now relating to a mounting head according to a preferred embodiment of the invention, as used in a windscreen wiper arm of FIG. 1.

DETAILED DESCRIPTION OF EMBODIMENTS

FIG. 1 shows a preferred variant of a windscreen wiper arm 1 according to the invention. As illustrated in FIG. 1, the windscreen wiper arm 1 according to the invention comprises a plastic mounting head 2 which can be fixed for rotation to a shaft 3 driven, via a mechanism not illustrated, by a small motor. The windscreen wiper arm 1 further comprises a plastic arm member 4 supported by the mounting head 2, wherein the arm member 4 in turn supports a wiper blade (not shown) with the help of a connecting device (not shown). The arm member 4 is pivotally connected to the mounting head 2 by means of a pivot pin 5, for example in the form of a rivet. A spring (not shown) is hooked with its first end on the mounting head 2 and with its second end on to the arm member 4 in order to ensure that the arm member 4 and thus the wiper blade connected thereto is pressed onto a windscreen to be wiped. In use, the shaft 3 rotates alternately in a clockwise and in a counter-clockwise sense carrying the mounting head 2 into rotation also, which in turn draws the arm member 4 into rotation and by means of the connecting device moves the wiper blade.

As illustrated, the arm member 4 has a substantially U-shaped cross-section near the pivot pin 5 comprising two side walls 6,7, wherein the side walls 6,7 extend between a part of the mounting head 2 and beyond the pivot pin 5. the part of the mounting head 2 is provided with opposite surfaces 8,9. The opposite surfaces 8,9 of the mounting head 2 and the sidewalls 6,7 of the arm member 4 are spaced-apart, i.e. placed at a distance D from each other. The distance D is particularly chosen between 0.05 mm and 0.3 mm.

Figure 2:
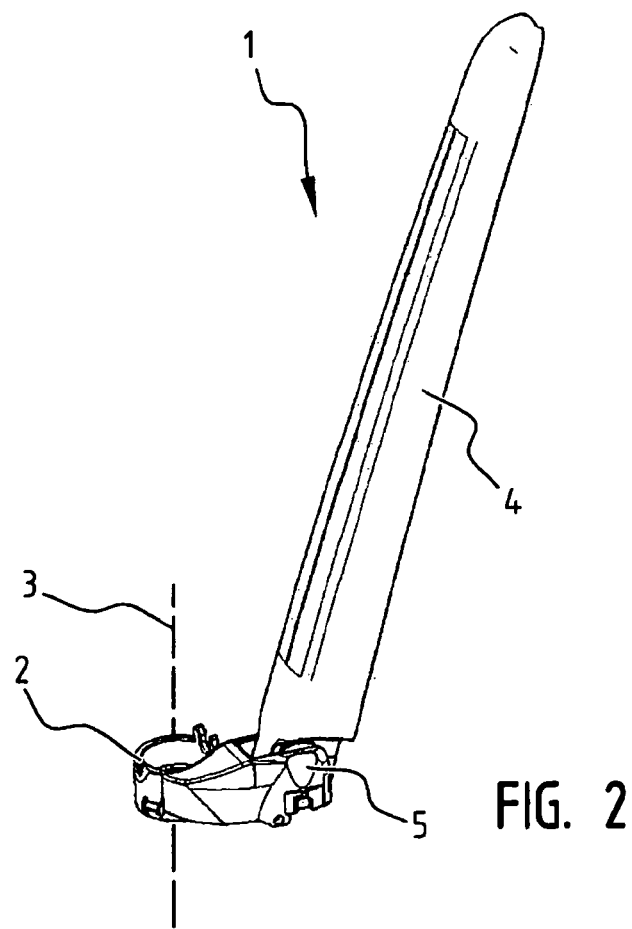
FIG. 2 shows a perspective, schematic view of the windscreen wiper arm of FIG. 1 in a so-called service position.

As indicated above, the arm member 4 is pivotally connected to the mounting head 2 by means of the pivot pin 5, wherein the arm member 4 can be pivoted between a wiping position (or "working position"; see FIG. 1), wherein the arm member 4 extends parallel to a windscreen to be wiped, and an elevated or upright position (or "service position"; see FIG. 2), wherein the arm member 4 and/or a windscreen wiper blade to be attached thereto can be repaired or replaced.

In FIG. 3 is shown a mounting head 2 according to the prior art, wherein the pivot pin 5 is seen from below. This pivot pin 5 is an integral part of the known mounting head 2 and forms a bridge between the opposite surfaces 8,9 thereof. As depicted in FIGS. 3 and 4, the pivot pin 5 has a flat bottom surface 10 and a curved upper surface 11, such that the cross-section of the known pivot pin 5 extends along a semi circle. In FIG. 4 is illustrated how the arm member 4 and the mounting head 2 are placed during interconnection according to the prior art before being mounted onto a car, wherein a free end of the arm member 4 is moved from below towards the mounting head 4, such that the pivot pin 5 is introduced into a correspondingly shaped recess 12 of the arm member 4. Due to the semi circle shaped pivot pin 5, seen in cross-section, and the correspondingly shaped recess 12 in the arm member 4, mutually cooperating during assembly, the pivot pin 5 can be introduced into the recess 12.

FIG. 5 is a cross-sectional view of a so-called working position according to the prior art (FIG. 5a) of the arm member 4 and the mounting head 2 of FIG. 4, as used in a windscreen wiper arm 1 of the type of FIG. 1. FIGS. 5b, 5c and 5d are a cross-sectional view along the line C-C, D-D and E-E, respectively, in FIG. 5a. Corresponding parts have been designated with the same reference numerals.

FIG. 6 is a front view of the service position according to the prior art (FIG. 6a) of the arm member 4 and the mounting head 2, while FIGS. 6b and 6c are a cross-sectional view along the line A-A in FIG. 6a and the line B-B in FIG. 6b, respectively. Again, corresponding parts have been designated with the same reference numerals.

As illustrated in FIG. 7, in the prior art a pivot movement of the arm member 4 relative to the mounting head 2 in a direction away from a windscreen to be wiped, due to a force 13, is allowed beyond a certain maximum pivot angle. Accordingly, due to a smaller counter force 14 on the pivot pin 5 at a location 16 in the recess 12, the pivot pin 15 may leave the recess 12. As a result the arm member 4 may become detached from the mounting head 2.

Figure 9A:
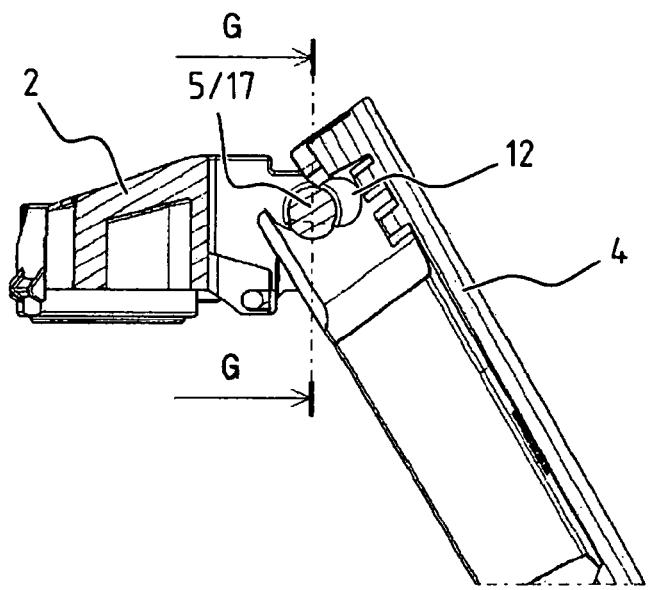
Figure 9B:
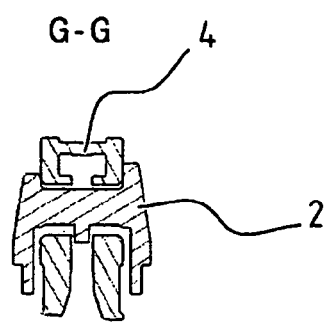
Figure 10A:
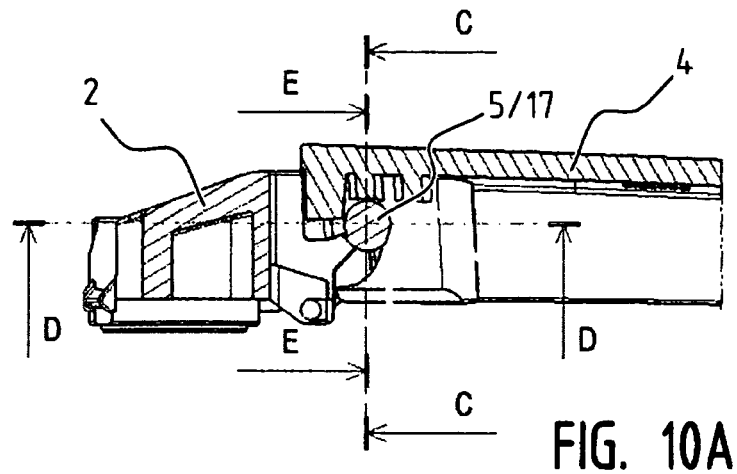
Figure 10B:
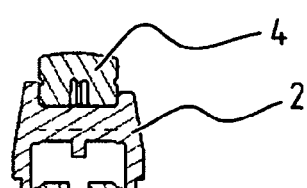
Figure 10C:
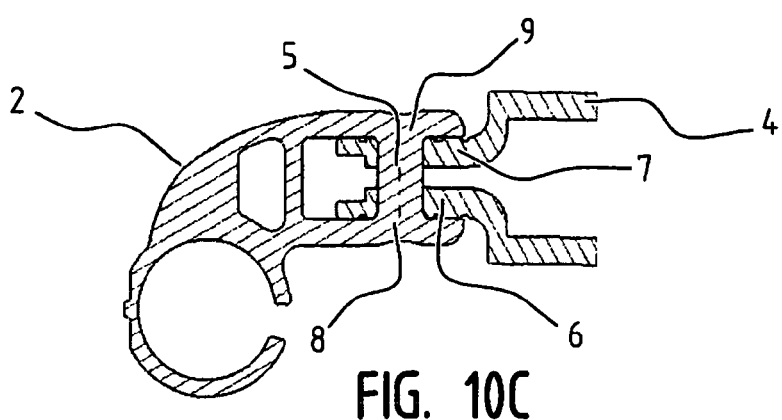
Figure 10D:
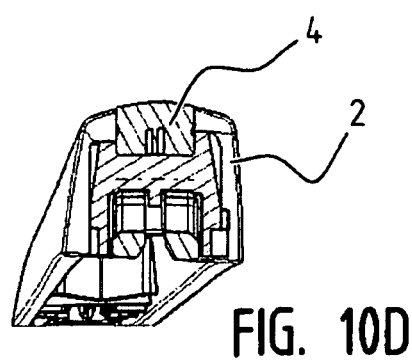

FIGS. 8 through 11 correspond to FIGS. 3 through 6, but now relating to a mounting head according to a preferred embodiment of the invention, as used in a windscreen wiper arm of FIG. 1. The present mounting head 2 corresponds to the one of the prior art shown in FIG. 3, with the difference that now a protrusion 17 on the pivot pin 5 is used. The protrusion 17 is made in one piece with the pivot pin and thus with the mounting head 2. In FIG. 9 is depicted how the arm member 4 and the mounting head 2 are interconnected according to the invention before being mounted onto a car, wherein a free end of the arm member 4 is moved from below towards the mounting head 4, such that the pivot pin 5 is introduced into a correspondingly shaped recess 12 of the arm member 4. In the wiping position of the arm member 4 (or "working position"; see FIG. 10), the protrusion 17 extends downwardly from the pivot pin 5 towards the windscreen to be wiped in order to lock the pivot pin 5 into the recesses 12 in order to prevent the pivot pin 5 from disengaging from the recesses 12 in the elevated position (or "service position"; see FIG. 11) of the arm member 4. As illustrated in FIG. 11, in the elevated position of the arm member 4, the protrusion 17 abuts against an end wall 18 of the U-shaped cross-section of the arm member 4.

The invention is not restricted to the embodiment shown, but extends also to other embodiments falling within the scope of the appended claims.

The invention claimed is:

1. A windscreen wiper arm, comprising a mounting head mountable on a drive shaft and an arm member pivotally connected to the mounting head by means of a pivot pin, and wherein the arm member can be pivoted between a wiping position, wherein the arm member extends parallel to a windscreen to be wiped, and an elevated position, wherein the arm member and/or a windscreen wiper blade to be attached thereto can be repaired or replaced, wherein said windscreen wiper arm is provided with locking structure arranged to lock said arm member onto said pivot pin in order to prevent said arm member from disengaging from said pivot pin in the elevated position of said arm member, and wherein said locking structure includes at least one protrusion extending from a flat bottom surface of the pivot pin, wherein in the wiping position of the arm member the protrusion extends downwardly from the pivot pin toward the windscreen to be wiped in order to lock the pivot pin into recesses of the arm member in order to prevent the pivot pin from disengaging from the recesses in the elevated position of the arm member.

2. A windscreen wiper arm according to claim 1, wherein said arm member has a substantially shaped cross-section near said pivot pin, wherein sidewalls of said U-shaped cross-section are each provided with a recess accommodating said pivot pin, and wherein said locking structure is arranged to lock said pivot pin into said recesses in order to prevent said pivot pin from disengaging from said recesses in the elevated position of said arm member.

3. A windscreen wiper arm according to claim 2, wherein said arm member is made of metal.

4. A windscreen wiper arm according to claim 1, wherein, in the elevated position of said arm member, said protrusion abuts against an end wall of said U-shaped cross-section of said arm member.

5. A windscreen wiper arm according to claim 1, wherein the arm member is made of a plastic material.

6. A windscreen wiper device comprising the windscreen wiper arm according to claim 1.

7. A windscreen wiper device according to claim 6, wherein it comprises an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, which windscreen wiper device comprises a connecting device for the windscreen wiper arm.

8. Method for manufacturing a windscreen wiper arm, comprising a mounting head mountable on a drive shaft pivotally connecting an arm member to the mounting head by means of a pivot pin, and wherein the arm member can be pivoted between a wiping position, wherein the arm member extends parallel to a windscreen to be wiped, and an elevated position, wherein the arm member and/or a windscreen wiper blade to be attached thereto can be repaired or replaced, wherein the windscreen wiper arm is provided with locking structure arranged to lock said arm member onto said pivot pin in order to prevent said arm member from disengaging from said pivot pin in the elevated position thereof, and wherein said locking structure includes at least one protrusion extending from a flat bottom surface of the pivot pin, wherein in the wiping position of the arm member the protrusion extends downwardly from the pivot pin toward the windscreen to be wiped in order to lock the pivot pin into recesses of the arm member in order to prevent the pivot pin from disengaging from the recesses in the elevated position of the arm member.

* * * * *